United States Patent [19]

Alitz et al.

[11] Patent Number: 4,600,925
[45] Date of Patent: Jul. 15, 1986

[54] VECTOR PHASE ANGLE CHANGE DISTRIBUTION PROCESSOR

[75] Inventors: Orville J. Alitz; David P. Moos, both of Marion, Iowa

[73] Assignee: Rockwell International Corporation, El Segundo, Calif.

[21] Appl. No.: 481,535

[22] Filed: Apr. 1, 1983

[51] Int. Cl.$^4$ ............................................. G01S 13/95
[52] U.S. Cl. ............................... 343/5 SA; 343/5 W; 343/5 NQ
[58] Field of Search ............... 343/5 W, 5 SA, 5 NQ, 343/5 DP; 364/420, 485; 324/77 B, 83 Q; 73/170 R

[56] References Cited

U.S. PATENT DOCUMENTS 3,491,358  1/1970  Hicks .................................. 343/5 W
4,408,284 10/1984  Kijesky et al. ..................... 324/77 B

OTHER PUBLICATIONS

Lhermitte et al., "Doppler Radar Methodology for the Observation of Convective Storms", Nov. 1970, 17th Radar Meterology Conf., pp. 133–138.

Primary Examiner—Thomas H. Tarcza
Assistant Examiner—Gilberto Barron, Jr.
Attorney, Agent, or Firm—George A. Montanye; H. Fredrick Hamann

[57] ABSTRACT

A system and technique is disclosed for estimating the real-time spectral width of radar returns to provide an indication of weather turbulence. The system includes a Doppler radar to provide the in-phase and quadrature phase signals from successive range returns which are digitized and converted to a phase angle prior to processing. Successive angular samples at the pulse repetition frequency are subtracted to provide a phase angle change. The phase angle change is filtered to determine an average angular mean which is then subtracted from new angular samples to determine the angular deviation. The angular deviation for each sample is in turn compared with a threshold to provide an output which is averaged over time to determine when the standard deviation of the samples exceeds a reference value. When the standard deviation of the samples exceeds that reference value, the spectral width is of a magnitude which indicates the presence of turbulence.

21 Claims, 4 Drawing Figures

Microfiche Appendix Included
(5 Microfiche, 258 Pages)

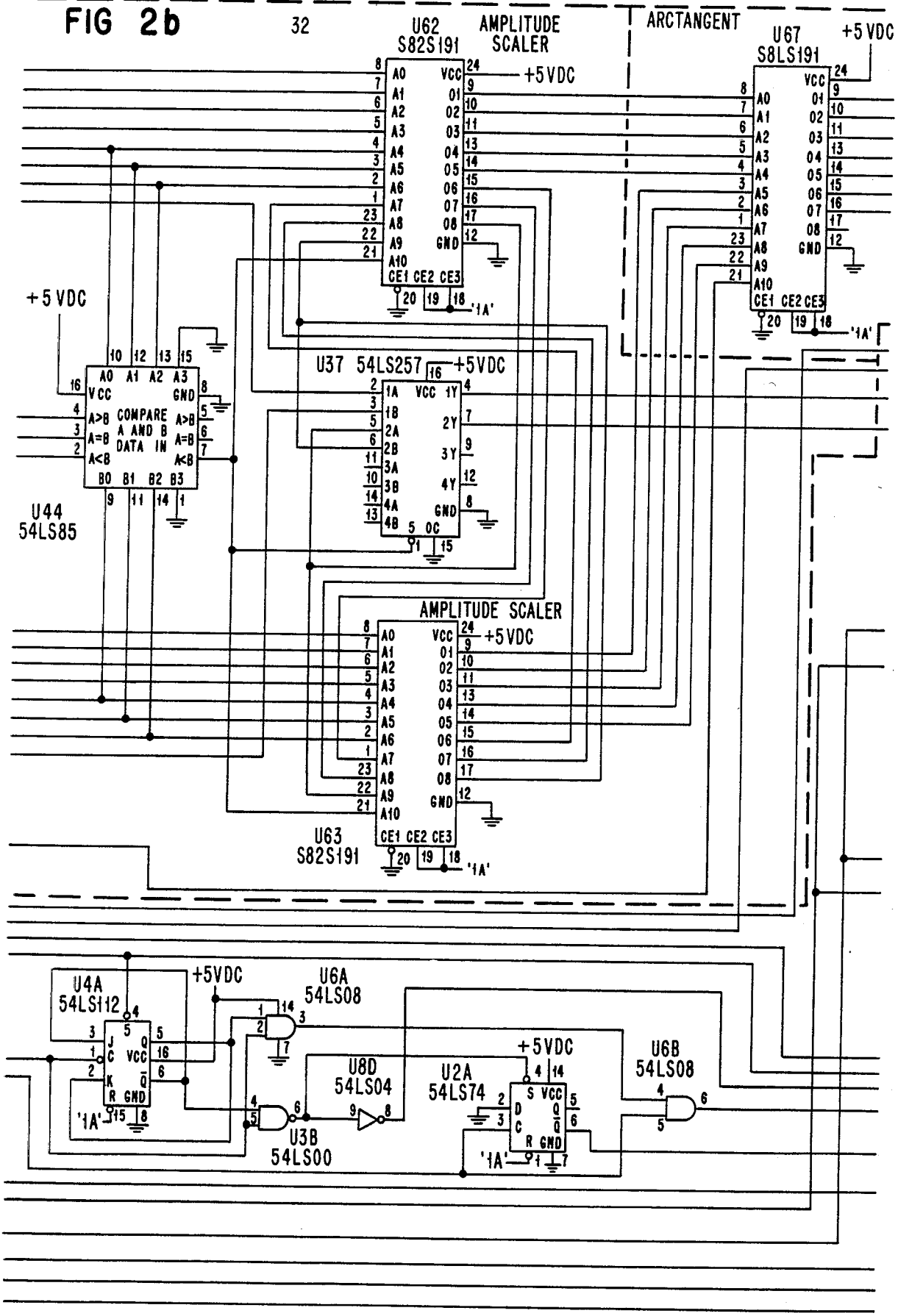

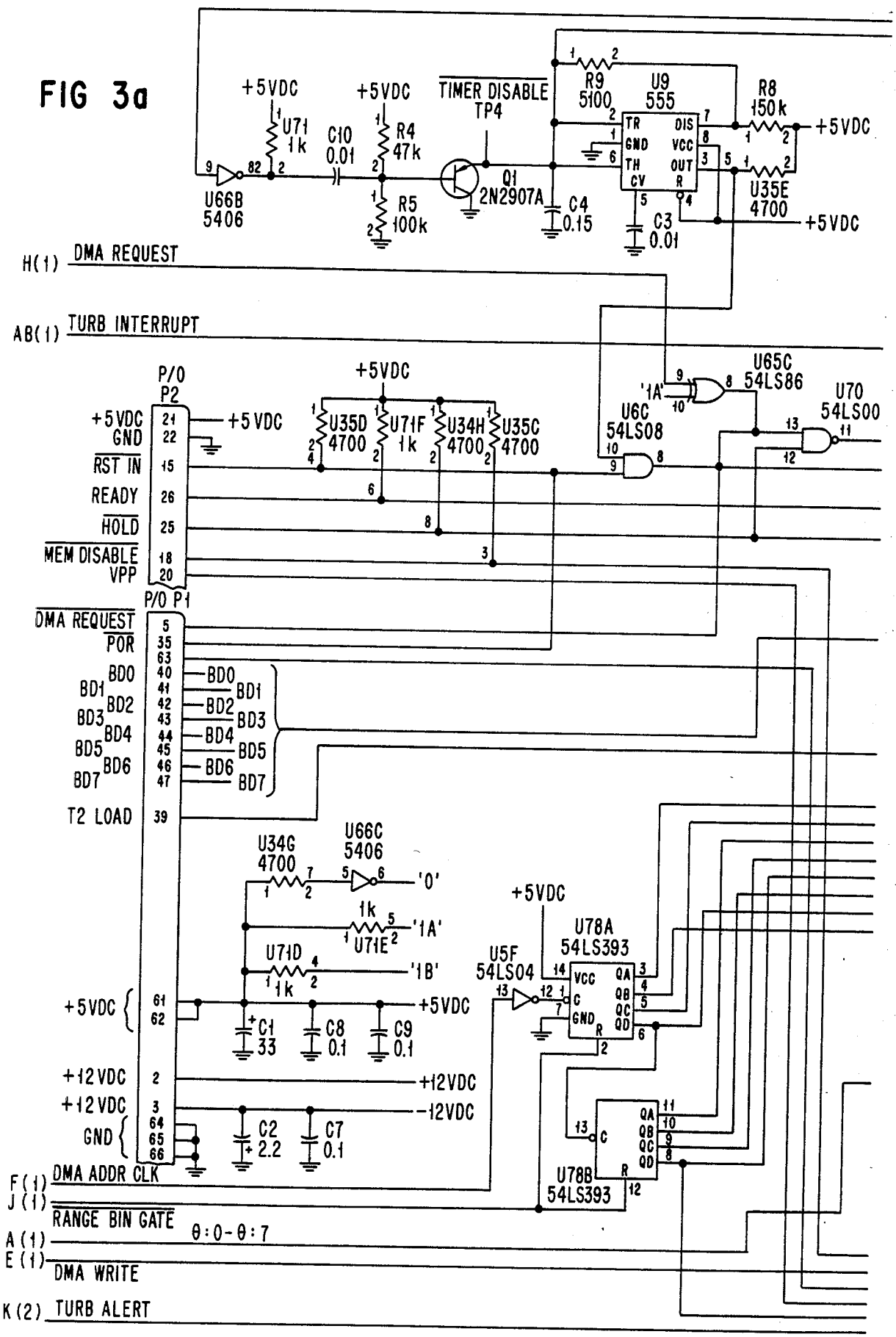

VECTOR PHASE ANGLE CHANGE DISTRIBUTION PROCESSOR

BACKGROUND OF THE INVENTION

A listing of computer programs and computer listings for date patterns referenced in the specification are set forth in microfiche appendices comprising 258 frames on five (5) microfiche.

The present invention relates to a radar processing system and technique, and more particularly to a vector phase angle processing technique for detecting the spectral width of radar returns.

The analysis of weather conditions by radar processing techniques has been utilized for some time. It has been particularly important for providing weather information to aircraft pilots so that they may avoid flying in areas of rain, thunderstorms, or other adverse weather conditions. As a general rule, in addition to making a flight more uncomfortable, severe weather conditions pose potential hazards which may affect the safety of aircraft flight. Accordingly, pilots have used both on-board weather radars and ground radars for recognizing and avoiding flight areas that may be uncomfortable or unsafe, depending upon the severity of the weather.

One of the most troublesome and potentially dangerous weather conditions is that produced by turbulence. Turbulence may be present as a sheer zone in which there are variable velocity vertical air currents moving in opposite directions adjacent to one another. Turbulence may also be present in the form of air currents having stirring motions rather than the above-described sheer zone. In both cases, the continually changing velocities are of primary concern. It is the changing velocity of the air mass which provides significant hazard to aircraft flight, particularly in the case of sheer zones.

In the prior art, various weather radars, and in particular Doppler radars, have used a variety of techniques to enable turbulence detection. One such technique includes the visual display of the gradient of precipitation in a storm area as the radar monitors the particular rates of precipitation. In this instance, the gradient is viewed as a change in the rate of precipitation between adjacent areas. In cases where the gradient exhibits extreme changes, there is a likelihood that turbulence is present. Accordingly, the display of the gradient may be used as an indication of turbulence.

The above technique, however, has several disadvantages. First, a display of the gradient does not always indicate the presence of turbulence. Pilot interpretation of the gradient, for example, may be inaccurate, since turbulence may be present even in the absence of an extremely changing gradient. In other instances, turbulence may be absent even in the presence of an extremely changing gradient. In either case, pilot reliance on the gradient display can result in the operation of an aircraft to avoid turbulence that does not exist, or the operation of an aircraft in a turbulent area where turbulence is not visually indicated. In addition, prior art systems displaying the gradient are affected by the attenuation of radar returns due to intervening but undetectable precipitation. In those instances, the attenuation caused by the intervening precipitation can alter the magnitudes of the radar returns, thereby resulting in the display of inaccurate precipitation rates.

Other known systems also provide radar indications of turbulence, using a determination of spectral width. By way of example, pulse pair processing (PPP) and vector phase change (VPC) techniques, such as those described in the article "Spectral Mean and Variance Estimation via Pulse Pair Processing" by L. R. Novek, 16th Radar Meterology Conference, April 22-24, 1975, pp. 1-5, and "Estimation of Spectral Density Mean and Variance by Covariance Argument Techniques" by Dale Sirmans and Bill Bumgardener in the same 16th Radar Meterology Conference, April 22-24, pp. 6-13, have been employed to make determinations of spectral widths, as an indication of turbulence. In such systems, the Doppler radar transmitter transmits a pure frequency which is reflected by the target, in this case precipitation or other weather conditions. The reflected radar return, in contrast to the transmitted frequency, is not a pure frequency but a spectrum of frequencies determined by the velocity changes in the target being observed. It is known that in turbulent areas, the spectral width of the radar return increases over its width in the absence of turbulence. Accordingly, the PPP and VPC techniques are designed to make determinations of that spectral width as a measure of the turbulence present in a selected target area.

Although prior art PPP and VPC systems have been somewhat successful, various problems have been encountered in using the computed spectral width determinations to indicate turbulence. In particular, although such systems may be useful when employed in ground stations to determine weather conditions from a stationary position, the same systems are highly unreliable and inaccurate when used in aircraft due to aircraft movement, antenna scan, and other size, weight and cost restrictions. In particular, aircraft velocity changes often cause frequency shifts in the return which look like changes in the spectral width and thereby provide false indications of turbulence. Further, ground systems may employ large, expensive and powerful radar systems which cannot be used in an aircraft weather radar to enable in-flight pilot analysis. Additionally, prior art techniques often require substantial processing capabilities and hardware which prohibit implementation of the analysis by state-of-the-art digital processing techniques and microprocessor control.

In still other instances Fast Fourier Transform (FFT) chips have been used to provide the spectral analysis. However, in this type of system, an FFT chip is required for each range bin thereby leading to unacceptable hardware complexity. Additionally, inaccuracies caused by spectrum spread with antenna scan angle and complex threshold interpretations may limit the system to acceptable operation only when the antenna scan is stopped or slowed. Accordingly, in view of the trend toward complete digital implementation of aircraft avionics systems, there is a strong need for radar return processing systems which are capable of analyzing the returns on a real-time basis under microprocessor control to provide highly accurate measurements of spectral width as an indication of turbulence at normal antenna scan speeds.

Accordingly, the present system and technique has been developed to overcome the specific shortcomings of the above known and similar techniques, and to provide a spectral width detection system which allows real-time spectral width estimation of radar returns.

SUMMARY OF THE INVENTION

In accordance with the invention, the in-phase and quadrature phase components of received radar returns are digitized and provided as input to a processing system which detects successive angular samples over the pulse repetition frequency (PRF) interval of the radar. The successive angular samples are subtracted to provide a phase angle change which consists of the mean phase angle plus a deviation angle. Phase angle change is subsequently filtered to provide an average angular mean which is then subtracted from each new sample to provide an angular deviation. The angular deviation is compared to a threshold and averaged to determine when the standard deviation of the samples exceeds a reference set to provide an indication of turbulence.

It is therefore a feature of the present invention to provide a simplified, reliable and more efficient system and technique for processing radar returns.

Another feature of the invention is to provide a system and technique for determining the real-time spectral width of radar returns.

Still another feature of the invention is to provide a system and technique for detecting turbulence by analyzing the spectral width of radar returns.

A further feature of the invention is to provide a radar turbulence detection system which is capable of being deployed on a moving platform and accommodates the effects of antenna movement, antenna beamwidth, and aircraft velocity changes.

A still further feature of the invention is to provide a system and technique for processing vector phase angles from radar returns to provide an indication of spectral width.

Yet another feature of the invention is to provide a simple radar return processing technique which enables real-time processing of spectral width at the same antenna scan speeds used for precipitation.

Yet a further feature of the invention is to provide a radar turbulence detection system which may be time-shared with a radar precipitation measurement technique without penalty in antenna scan speed.

These and other advantages and novel features of the invention will become apparent from the following detailed description when considered with the accompanying drawings wherein:

DETAILED DESCRIPTION OF A PREFERRED EMBODIMENT

Figure 1:
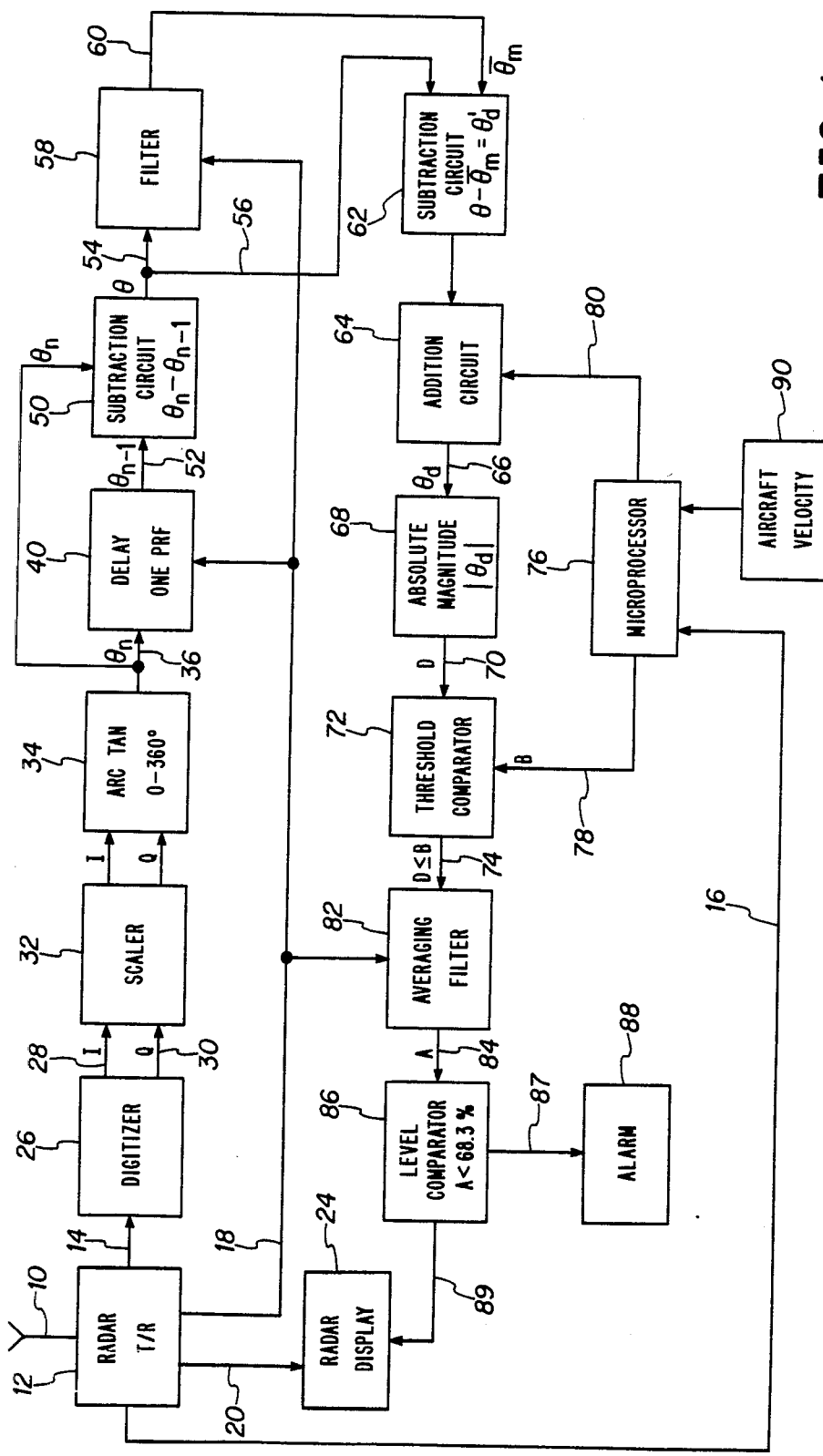
FIG. 1 is a block diagram depicting a vector phase angle distribution processing system for determining spectral widths in accordance with the present invention.

Referring now to FIG. 1, there is shown a block diagram depicting one embodiment of the present invention. The present invention will be shown and described with respect to its construction and operation in a Doppler weather radar designed to detect spectral width as a measure of turbulence in a moving aircraft. It will be apparent, however, that the same system and spectral analysis technique may be used for a ground installation radar as well as for target identification and change-of-state identification in connection with both point and volumetric targets.

In FIG. 1, there is shown a conventional radar antenna 10 which is coupled to act as both a transmitting and receiving antenna in a Doppler radar system 12. The Doppler radar 12 may also be of conventional construction and operates to transmit a given frequency and receive returns reflected from a target at various ranges to determine the presence of targets and their velocity based on the change of frequency in the reflected returns. The antenna 10 may be scanned through an angle which allows the radar to view only targets in a direction of flight, or it may be scanned through an angle of 360° to view targets in a full circle about an aircraft or ground station. In an application wherein the radar is being used to detect weather conditions, either of the two operations may be appropriate depending on its use in an aircraft or from a stationary position.

The radar transmitter/receiver (T/R) 12 may provide a plurality of outputs including in-phase and quadrature phase signals from line 14, a signal representing the scan angle of the antenna 10 from line 16, and a signal representing the range clock for discerning the range of reflected returns from the line 18. The Doppler radar 12 will normally process the radar returns and provide a further output 20 to a radar display 24 which represents the targeted weather condition of the radar. In this instance, if the target is precipitation, the radar display 24 may provide a visual indication of the precipitation rate as it appears within the scan angle of the antenna and within the range capability of the radar.

As was previously noted, the prior art uses a conventional display of the gradient of the precipitation rate as an indication of turbulence. Accordingly, when the gradient exhibits a rapid change on the display 24, a pilot will interpret this as a detection of turbulence and avoid that particular area. Likewise, in areas where the gradient exhibits a less extreme rate of change, the areas are identified as acceptable for aircraft flight. Since turbulence is not always indicated by such gradient displays, aircraft flight is often altered for no substantial reason. In other cases, turbulence is encountered that should otherwise be avoided. As a result, the visual display of the gradient is not an accurate or reliable technique for detecting turbulence. Likewise, the prior art FFT detection techniques as well as the PPP and VPC techniques for determining spectral width, have not been acceptable due to the complex circuitry required for the analysis, the time-consuming nature of the processing, and the susceptibility of the systems to errors produced by changes in the antenna scan angle, scan speed and aircraft velocity.

In accordance with the present technique, the output 14 of the in-phase and quadrature phase signal from the radar 12 is provided to a digitizer 26 which may be a conventional analog-to-digital converter capable of producing digital representations of the in-phase and quadrature phase signals on lines 28 and 30, respectively. The in-phase and quadrature phase signals are normalized and coherently detected (sampled) signals which have been digitized. The digitized outputs from 28 and 30 are coupled to a scaling circuit 32 which scales the digitized in-phase and quadrature phase signal samples so that the maximum bit-accuracy of the arc tangent circuit 34 may be utilized. In this instance, the arc tangent circuit 34 utilizes the sampled in-phase and quadrature phase signals and their sign information to provide an angle output ($\theta_n$) in the range of 0° to 360° representing a sampled vector phase angle of the spectral return.

In the present instance, the system will be described with respect to its operation for a single range and therefore the processing of a single range bin. It will be apparent, however, that the process is equally applicable to any number of ranges represented by x range bins. It should be noted, that contrary to previous attempts to use vector phase changes to determine spectral widths, the present invention converts the phase component into an angle prior to processing. It is this change from phase to angle which converts the processing from a non-linear to a linear approach and prevents vector magnitude changes from affecting processing results.

The angle $\theta_n$ at the output of circuit 34 is coupled at output 36 to a digital delay 40 which provides that angle $\theta_n$ at a time delayed by one pulse repetition frequency (PRF) interval. This may be designated as $\theta_{n-1}$ since it represents the previous angular sample at a time when the current angle sample $\theta_n$ is being provided at output 36. The delay line 40 may typically be a shift register which holds one measurement for each radar range sampled when multiple ranges are being processed. The sampled angle $\theta_n$ is also provided at output 38 to a digital subtraction circuit 50 while the previous sampled angle $\theta_{n-1}$ is provided at output 52 as a second input to the same subtraction circuit 50. The circuit 50 produces a sampled vector phase angle change output $\theta$ on lines 54 and 56 which is the change between two successive samples of $\theta_n$ determined by the subtraction $\theta_n - \theta_{n-1} = \theta$. In this instance, $\theta$ is the sampled angle change on a PRF-to-PRF basis and consists of a representative mean angular change $\theta_m$ plus-or-minus a deviation angle $\theta_d$. It should be appreciated, that the PRF-to-PRF processing of the vector phase angle change eliminates the need to resolve the mean Doppler frequency of the returns and allows the return deviation $\theta_d$ spectrum width to be evaluated independent of the mean.

The sampled vector phase angle change $\theta$ is coupled over line 54 to a digital recursive low pass filter 58 which averages the input to provide an average angular mean $\bar{\theta}_m$ at output 60. $\bar{\theta}_m$ is equal to $\theta_m$ plus a bias introduced by the filter 58 as a result of, for example, a continuously changing scan angle of the antenna during measurement of $\theta$. The same sampled vector phase angle change $\theta$ also provided over line 56 as one input to another digital subtraction circuit 62. The output 60 is coupled to a second input of subtraction circuit 62 to subtract, in circuit 62, the biased average angular mean $\bar{\theta}_m$ from the new sample of the angle change $\theta(\theta_m \pm \theta_d)$ to produce a signal sample representing a biased angular deviation from the mean, $\pm \theta_d'$, (where $\theta_d'$ is equal to $\theta_d$ plus the bias introduced by the filter 58). The output from 62 is coupled to a digital summing circuit 64 which is known as a filter delay compensation circuit since it adds or subtracts appropriate compensating signals to the signal $\theta_d'$ to remove the bias introduced by filter 58 to produce the signal $\theta_d$ at output 66.

Output 66 is coupled to circuit 68 which operates conventionally to provide an output 70 representing the absolute value of the magnitude of the angular deviation from the mean ($|\theta_d|$). The absolute value of $\theta_d$ from circuit 68 is represented as D at output 70 and is provided as one input to a threshold comparator circuit 72 for comparison with a preset threshold B provided as a second inout to circuit 72 from output 78. The circuit 72 compares D and B to determine if D is $\leq$ B, in which case a digital 1 is provided as an output at 74. Alternately, if D is greater than B, a digital 0 is provided as an output at 74. The threshold B may be programmed and set by a microprocessor 76 which is also used to to provide the filter delay compensation at output 80 to the summing circuit 64 as was previously described, and as will be further detailed below. Naturally, the threshold signal B a output 78 from microprocessor 76 is a digital number which is digitally c-mpared in the conventional digital comparison circuit 72 with the digital number D representing the sample of the absolute value of deviation from the mean ($|\theta_d|$).

The digital 1 or 0 output from the comparison circuit 72 is provided to a digital averaging filter which accumulates samples to produce a stable average output after a predetermined number of samples have been processed through the system. The average output from the filter 82 is a signal A which is provided at output 84 to a digital level comparison circuit 86. Circuit 86 essentially compares the average of the digital 1 and 0 outputs from circuit 72 to determine when the number of digital 1's (as represented by the average A) is less than the predetermined percentage of 68.3 percent of the total number of digital 1's and 0's. When A $\leq$ 68.3 percent, the spectral width of the radar return is wider than allowed by the threshold B. At this point, an output 87 may be provided from the comparison circuit 86 to an alarm 88 which may provide a visual or audio signal indicating turbulence. The comparison circuit 86 may also produce an output 89 which is coupled to drive the radar display 24 to visually indicate turbulence on the radar display at the detected ranges. Naturally, is the average output A is $\geq$ 68.3 percent, the spectral width is $\leq$ the set threshold B and the outputs 87 and 89 are inhibited so that no turbulence indication is made by the alarm 88 or radar display 24.

As was previously noted, the summing circuit 64 provides filter delay compensation which compensates for the bias in the vector phase angle change $\theta$ introduced by the filter 58 and reflected in the signals $\bar{\theta}_m$ and $\theta_d'$. This compensation is calculated in a conventional manner in the microprocessor 76 based on the signal inputs from output 16 representing antenna scan angle and on the signal inputs from a conventional circuit 90 representing aircraft velocity. These two quantities are combined in accordance with the program detailed in Appendix A of the microfiche appendix filed in connection with this specification to calculate the appropriate compensating signal which is then provided at output 80 to summing circuit 64 for compensating the angular deviation $\theta_d'$ to produce $\theta_d$. Microprocessor 76 may be, for example, an INTEL 8085 which utilizes the PLM program of Appendix A or the alternative PLM program of Appendix L, both found in the microfiche appendix.

Figure 2A:
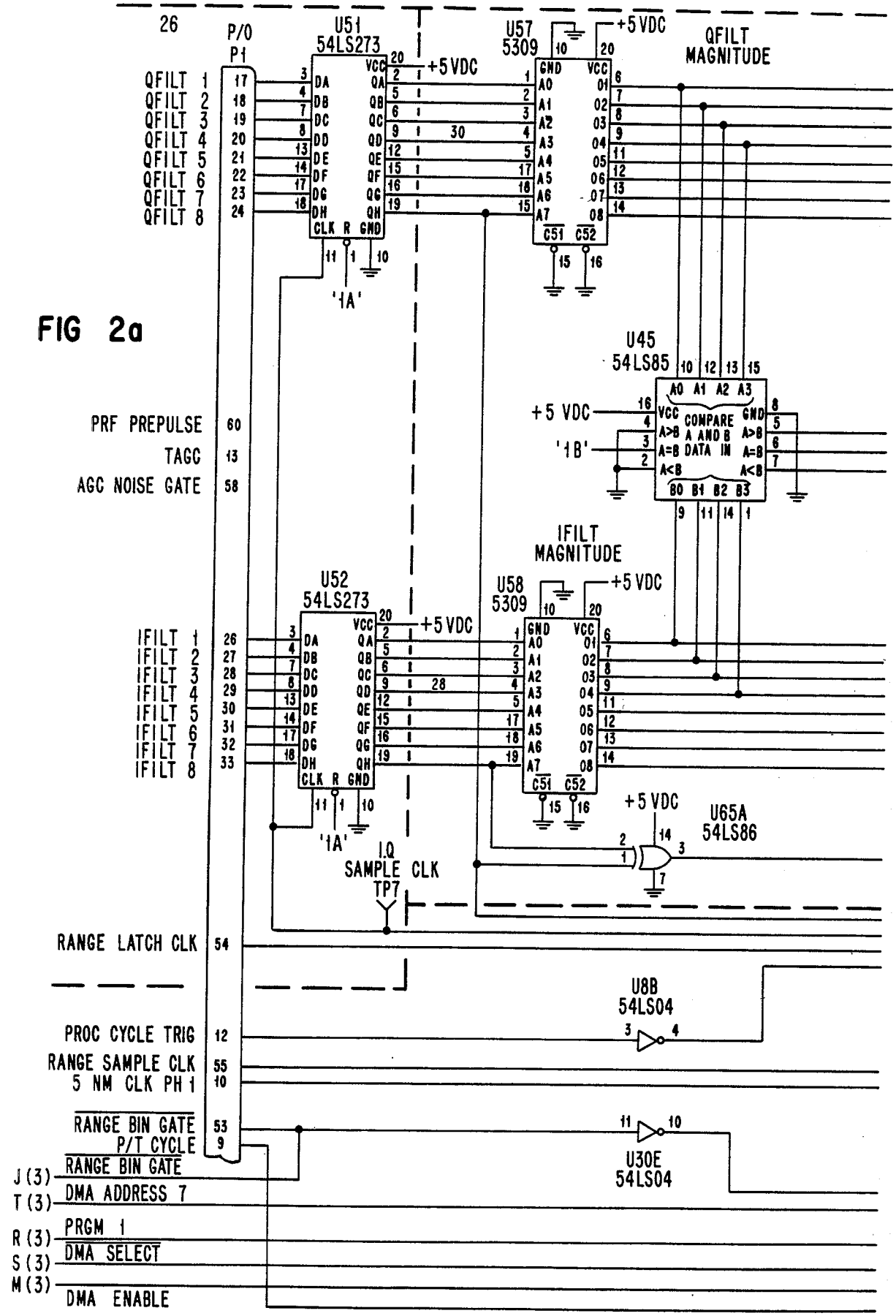
FIGS. 2, 3 and 4 are schematic circuit diagrams showing exemplary circuits for implementing the system of FIG. 1.
Figure 2C:
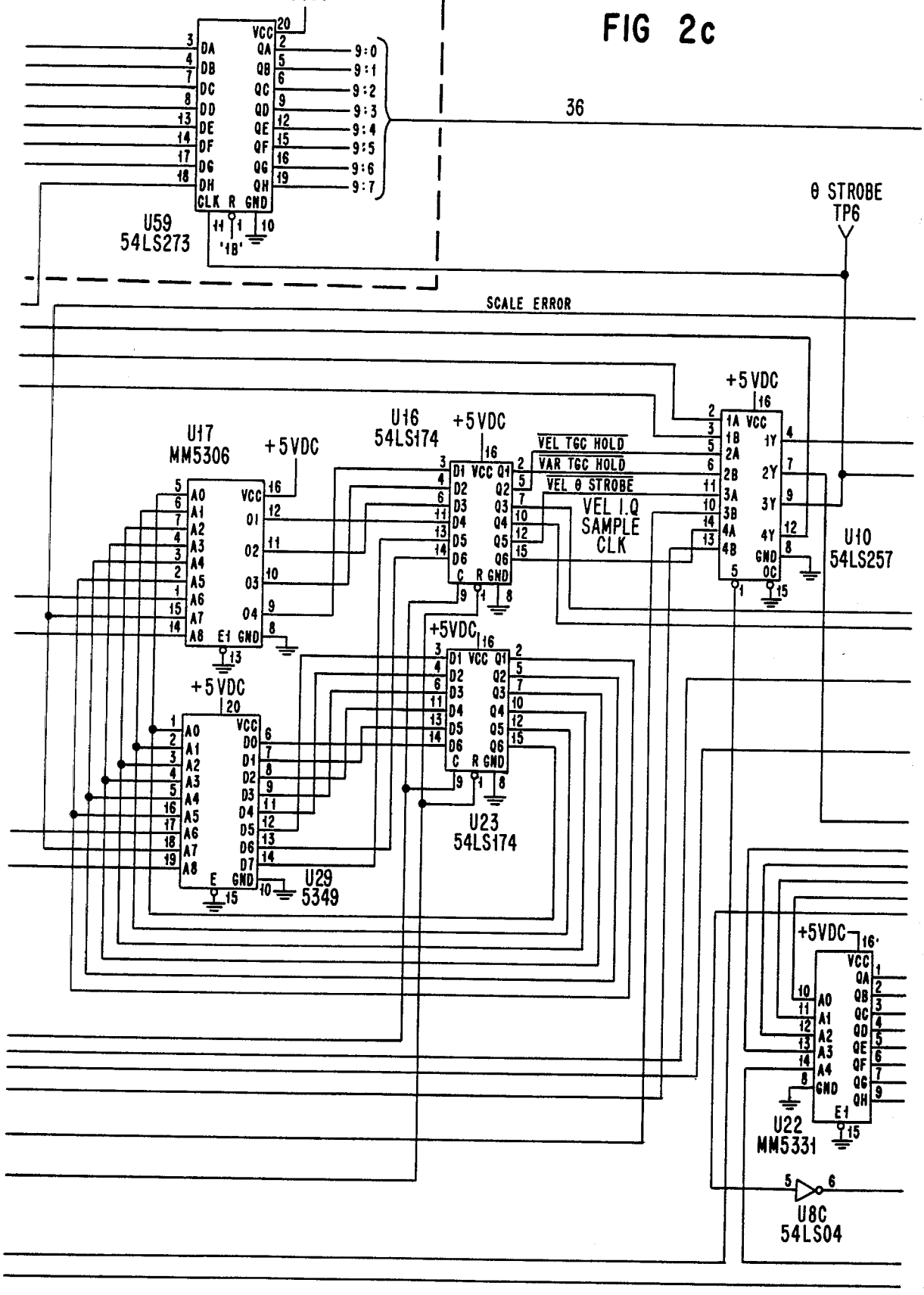
Figure 2D:
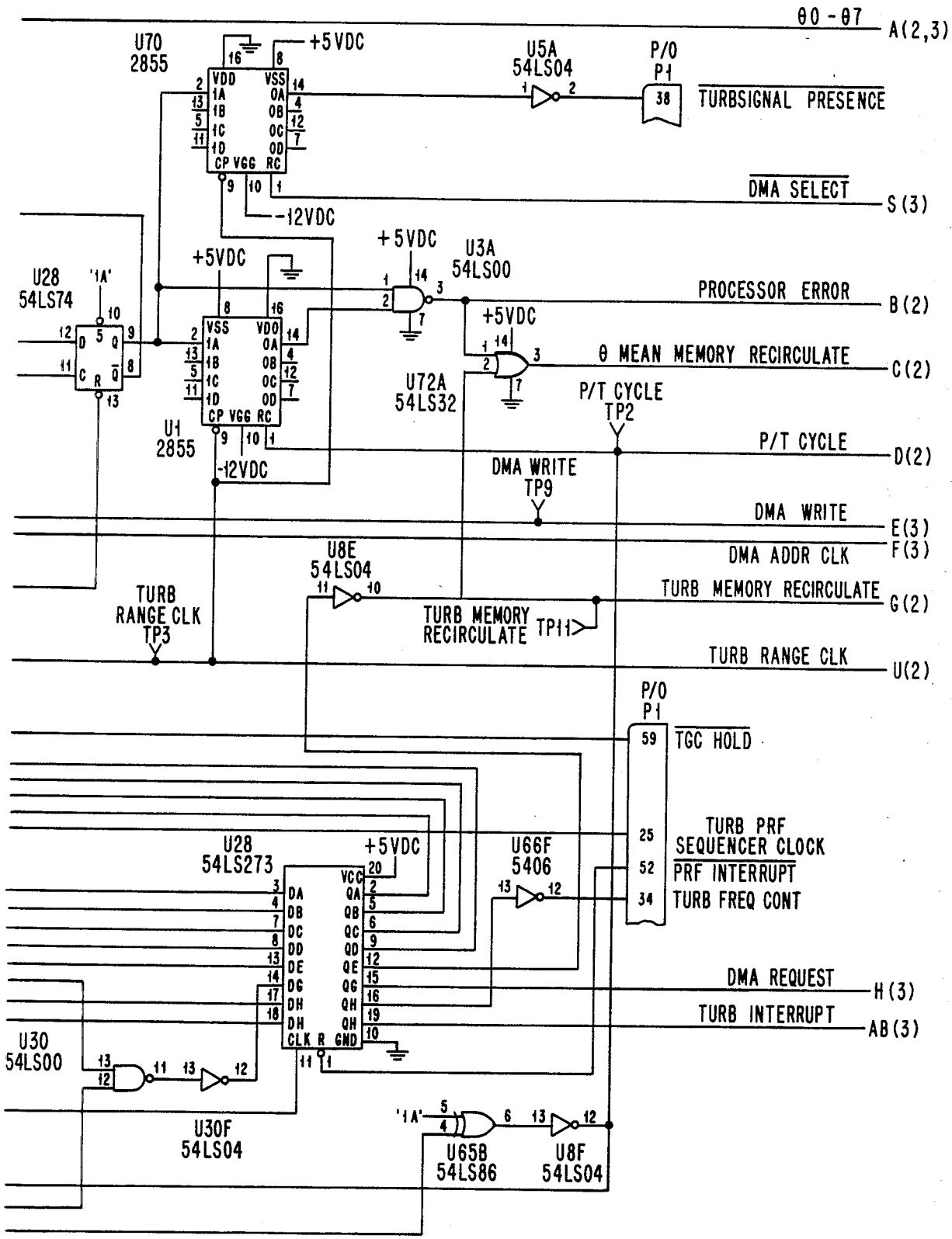
Figure 3B:
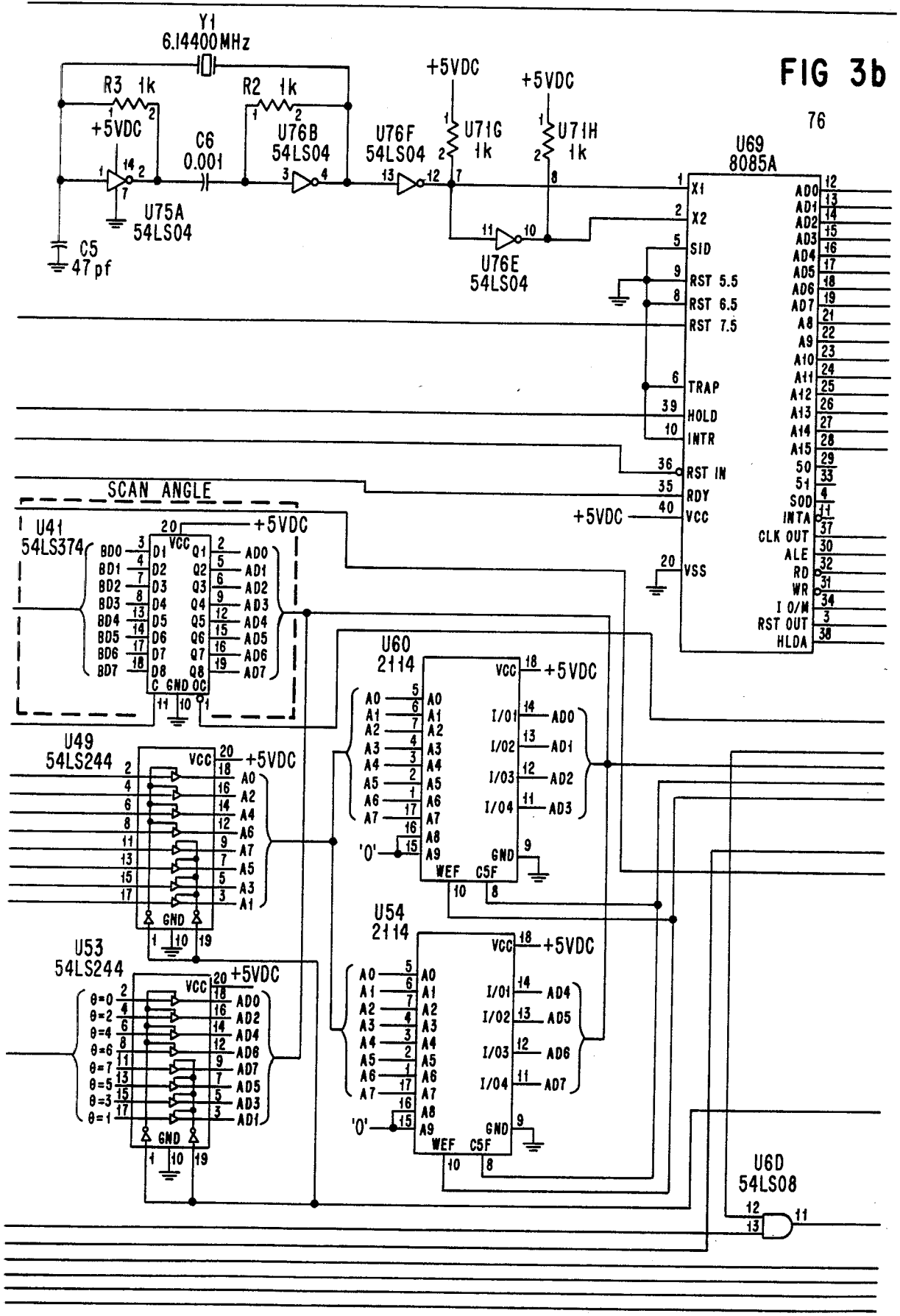
Figure 3C:
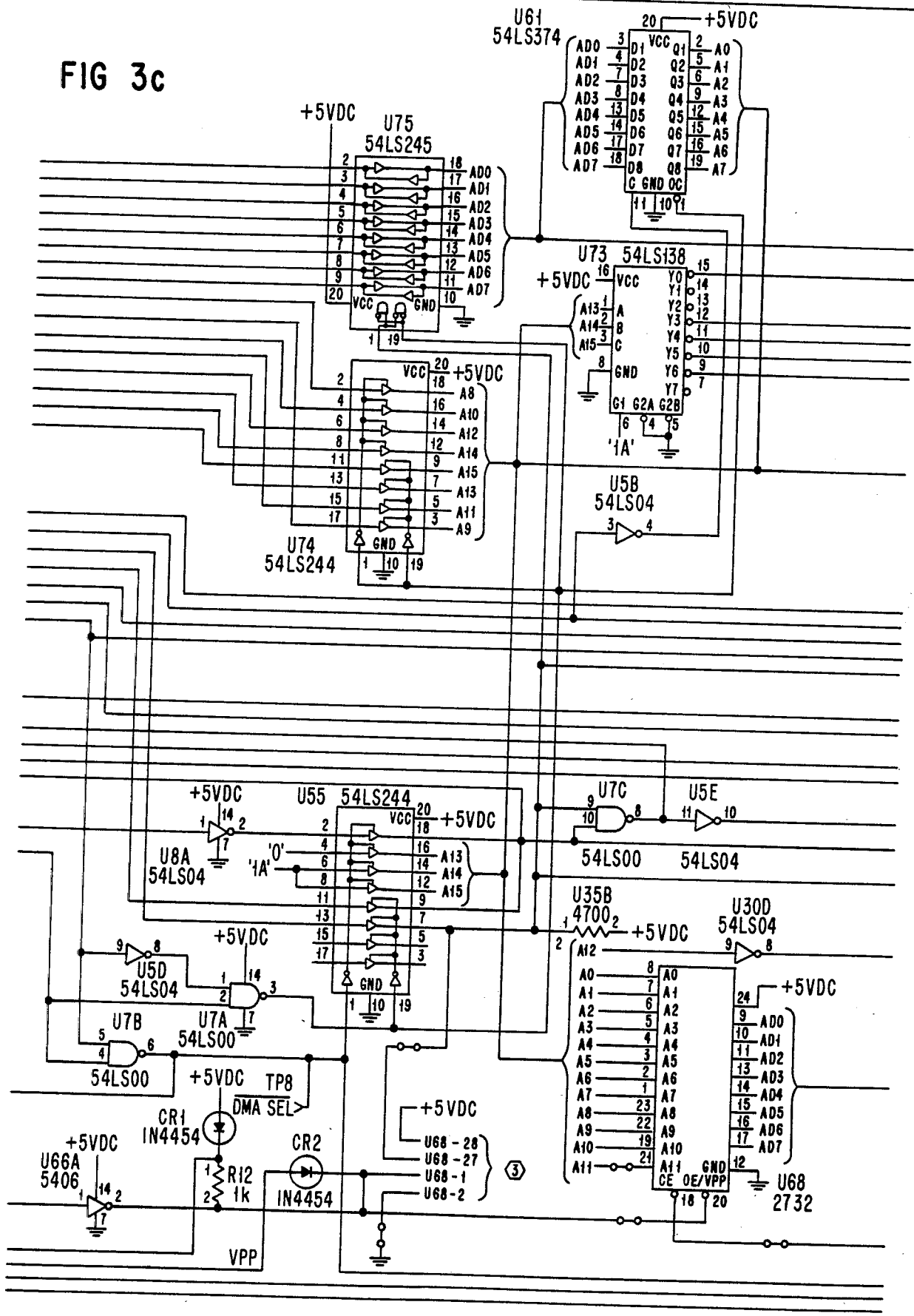
Figure 3D:
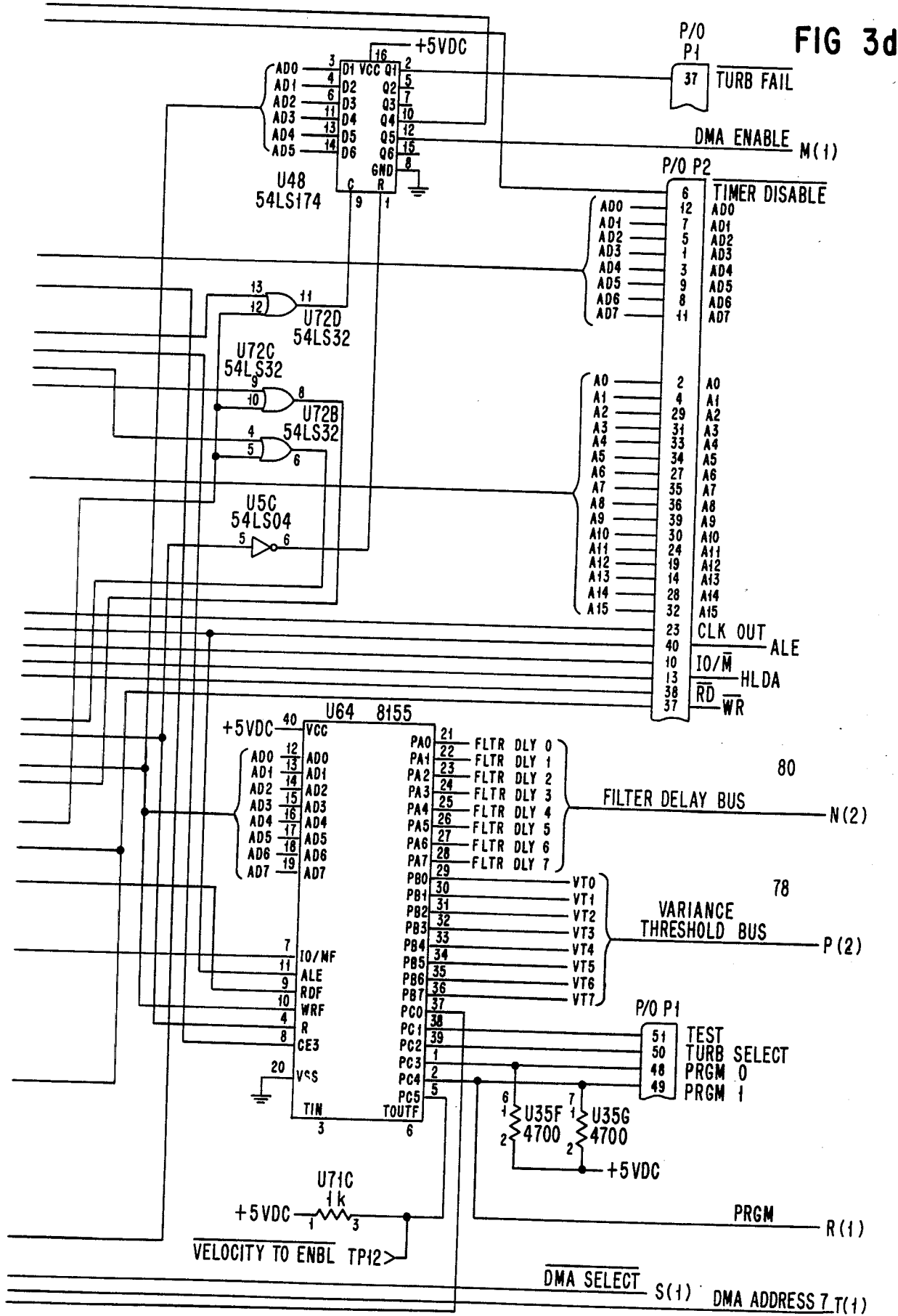
Figure 4A:
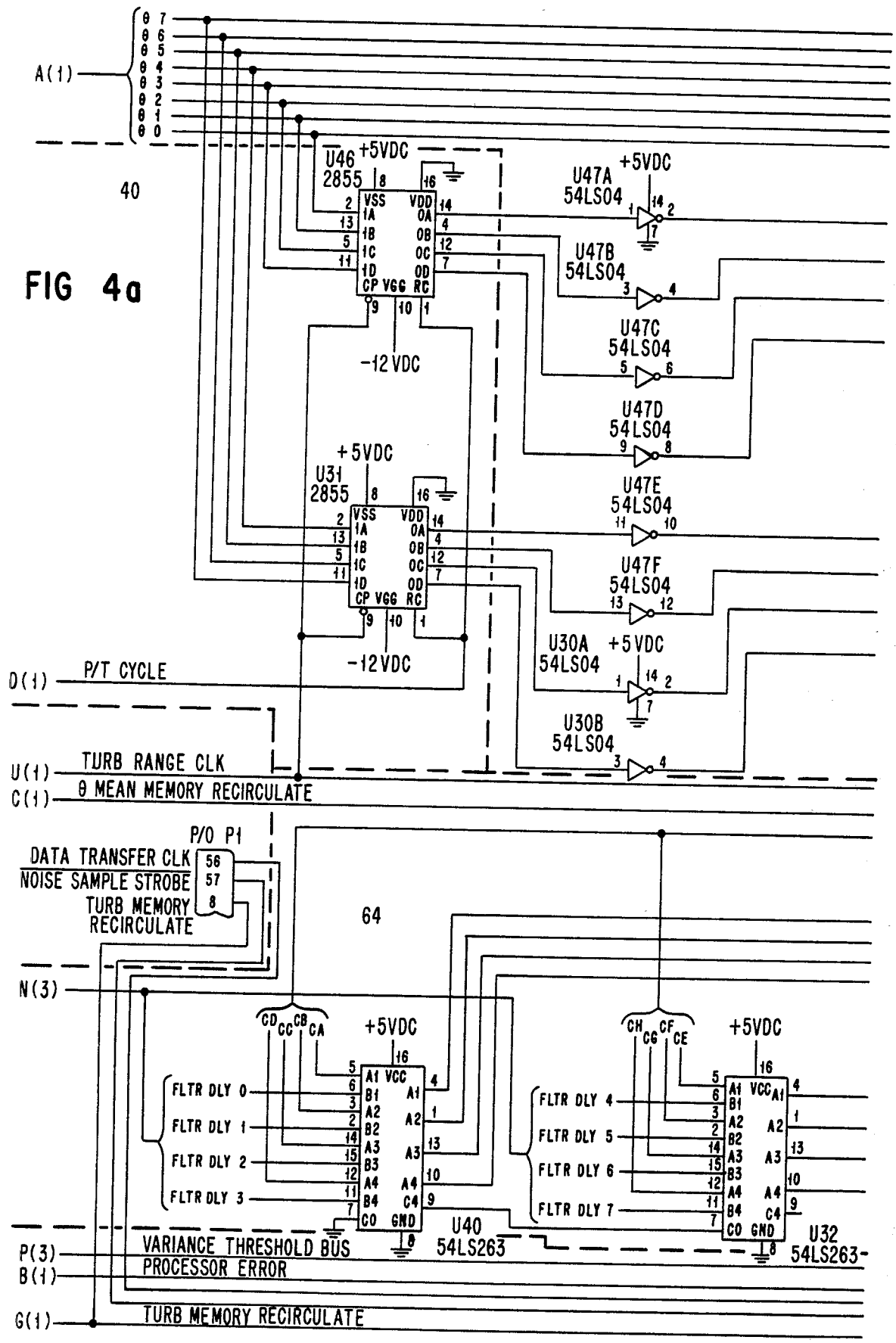
Figure 4B:
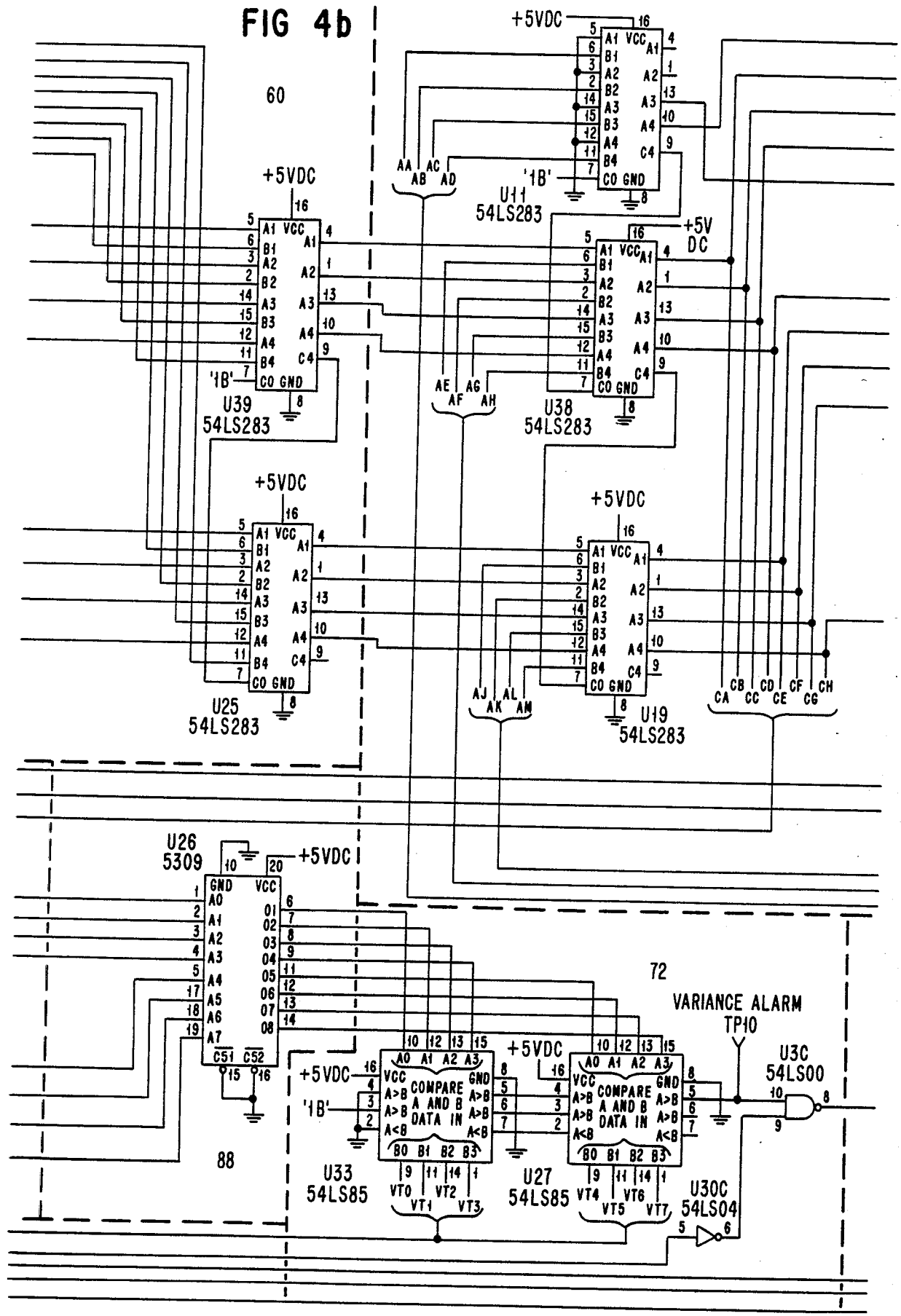
Figure 4C:
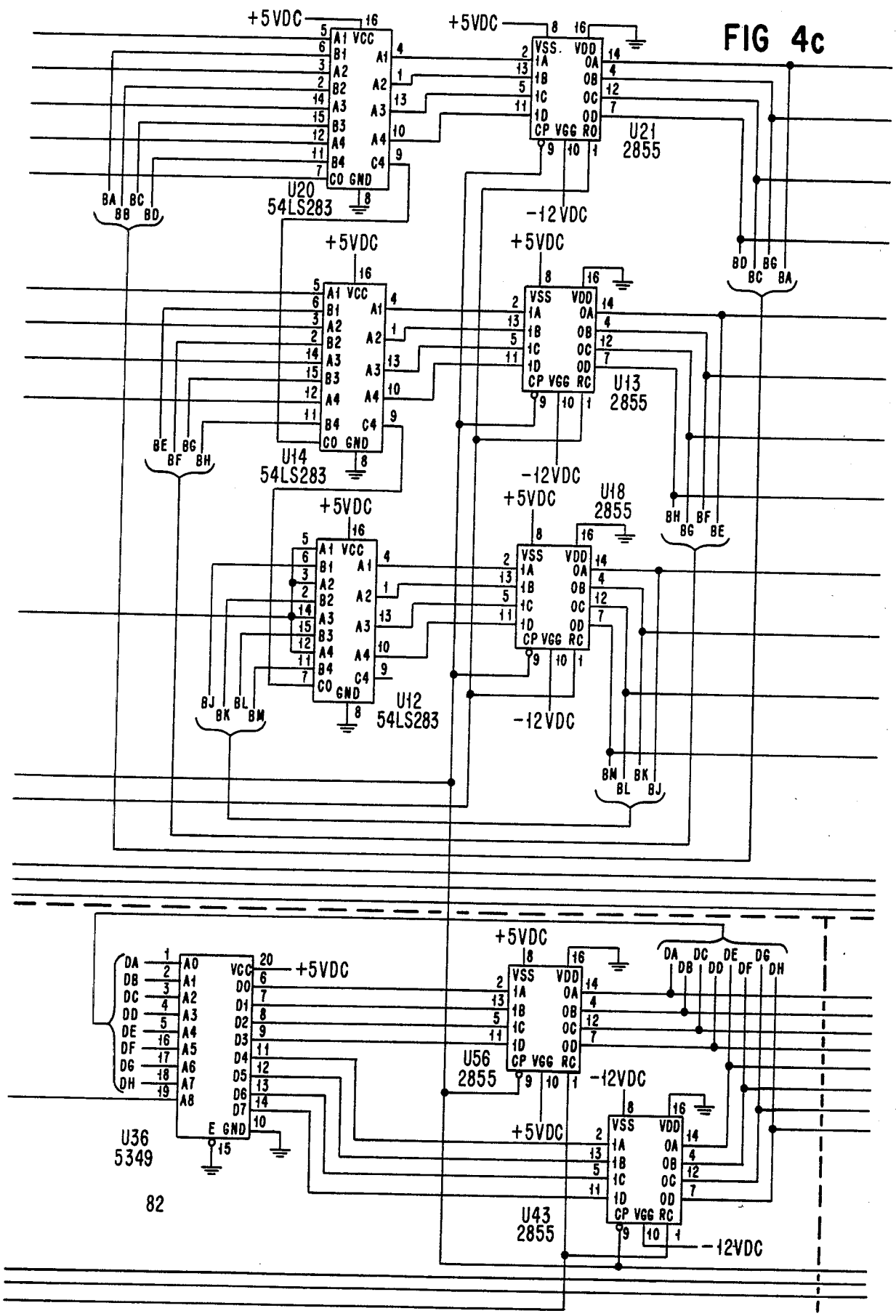
Figure 4D:
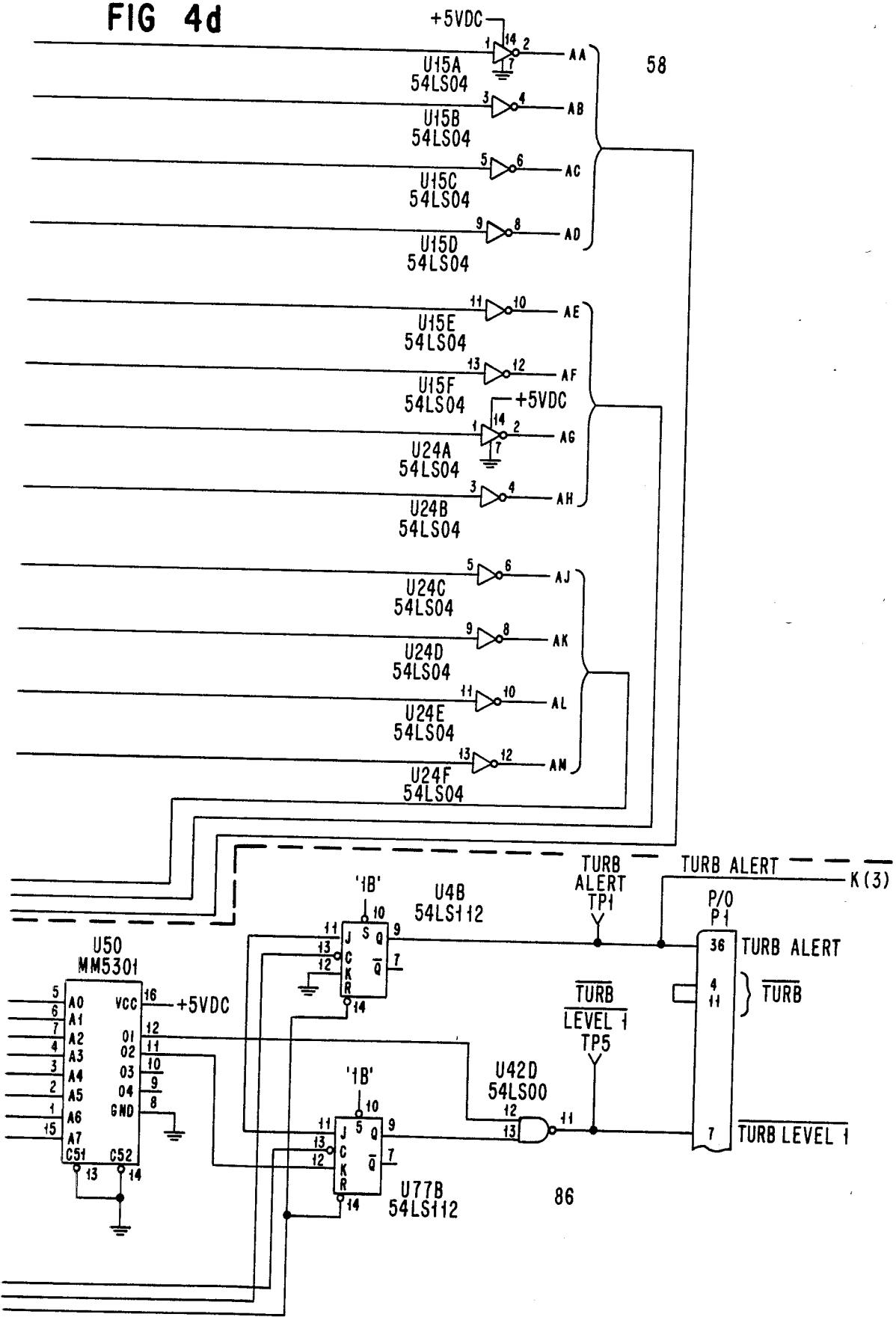

While it is considered that a variety of circuits could be used to implement the above described embodiment, FIGS. 2, 3 and 4 set forth one example of the detailed circuit which may be used to accomplish the radar processing described in FIG. 1. More specifically, the radar system could be that as produced by Rockwell International Corporation - Collins Divisions known as the WRT 701X having part number 622-5132-101 or the WRT 701C having part numbers 622-5122-102 or 622-5122-103. The circuits shown in FIGS. 2–4 are those as are contained on board AI0 of the radar, or more particularly, part number 652-5465-001. The A10 board plugs into the A11 board (at its bus P1 in FIGS. 2-4) in the radar system to produce the turbulence processing. The turbulence indication is then displayed as was previously described. The turbulence computer program for board A10 is that set forth in Appendix L of the microfiche appendix and identified as part number 614-3447-001.

In the detailed diagrams of FIGS. 2–4, each of the values for resistance, capacitance and inductance are given in ohms, microfarads, and microhenries, respectively, unless otherwise indicated, and the specific components and connections are as detailed in the diagrams. In addition, exemplary programs for generating the data patterns used in programmed read-only-memories (PROMs) U17, U22, U26, U29, U36, U50, U52, U57-/U58, U63 and U67 of FIGS. 2–4, and the generated data patterns for these PROMs, are set forth in the respective Appendices B through K all found in microfiche appendix. The data generating programs in this example are written in Fortran for a UNIVAC operating system.

While it is believed that the operation of the above system is apparent from the preceding description, the mathematical theory relating to the processing is set forth below in additional detail. More specifically, the vector phase angle change distribution processor described herein provides a unique way of determining the spectral width of the weather or other Gaussian return by verification of the probability distribution of the vector phase angle change relative to the mean phase angle change. In this process, successive angular samples obtained at a known sample interval (PRF) are subtracted to provide a phase angle change $\theta$ consisting of the mean phase angle $\theta_m \pm$ the deviation angle $\theta_d$, thereby resulting in:

$$\theta = \theta_m \pm \theta_d \quad (1)$$

In the circuit of FIG. 1, $\theta$ is produced by subtracting the current angle sample $\theta_n$ from the previous angle sample $\theta_{n-1}$ in the subtraction circuit 50. The sampled phase angle change $\theta$ is thereafter filtered by circuit 58 to yield the biased average angular mean sample $\bar{\theta}_m$. $\bar{\theta}_m$ is then subtracted from the new samples of the angular change e $(\theta_m \pm \theta_d)$ and the absolute value of the magnitude taken to provide the angular deviation $\theta_d$ (after compensation of $\theta_d'$ in circuit 64).

For a pulse coherent radar system return with I and Q (in-phase and quadrature phase) detected outputs, the above phase angle change $\theta$, mean phase angle $\theta_m$ and deviation angle $\theta_d$ are related to the in-phase and quadrature phase outputs. The mean phase angle change $\theta_m$ at any one range of the PRF is $$\theta_m = \frac{1}{N} \Sigma \left[ \text{Arc Tangent} \frac{Q_n}{I_n} - \text{Arc tangent} \frac{Q_{n-1}}{I_{n-1}} \right] \quad (2)$$

where n is the present sample, n−1 is the previous sample, and N is equal to the total number of samples summed in the data interval. The deviation from the mean $\theta_d$ can be represented as:

$$\theta_d = \left[ \text{Arc Tangent} \frac{Q_n}{I_n} - \text{Arc Tangent} \frac{Q_{n-1}}{I_{n-1}} \right] - \theta_m \quad (3)$$

$$= \theta - \theta_m$$

where $\theta$ is the angular change between two consecutive returns at the PRF interval as provided at the output of circuit 50.

Now, if a desired reference standard deviation $\sigma_r$ is chosen to represent a threshold width of the spectral return for turbulence, and the standard deviation of the samples $\sigma_s$ represents the actual width of the spectral return, then when $\sigma_s > \sigma_r$ turbulence will be detected. Accordingly, the samples are tested to determine if $\sigma_r$ is greater than the absolute value of $\theta_d$. If the absolute value of $\theta_d$ is equal to $\sigma_r$, then for a Gaussian distribution of radar returns, 68.3 percent of the values of absolute value $\theta_d$ will be $\leq \sigma_r$ and the standard deviation of the samples of the absolute value $\theta_d$ will be equal to $\sigma_r$ (i.e., $\sigma_r = \sigma_s$). If $\sigma_r$ is greater than $\sigma_s$, more than 68.3 percent of the values of the absolute value of $\theta_d$ will be $< \sigma_r$. Similarly, if $\sigma_r$ is less than $\sigma_s$, fewer than 68.3 percent of the values of the absolute value of $\theta_d$ will be $< \sigma_r$. By varying $\sigma_r$ over the processor range, a correct value for $\sigma_s$ can be obtained by observing when 68.3 percent of the values of the absolute value of $\theta_d$ are $< \sigma_r$. At this point, $\sigma$ is equal to $\sigma_s$. As will be seen, for spectral width determinations of turbulence, $\sigma_r$ may be selected as the threshold for turbulence and used to observe when the output A drops below 68.3 percent. When this occurs, the input signals have a spectral width such that $\sigma > \sigma_r$, thereby indicating the presence of turbulence.

The above relationships are best understood if it is considered that the radar return spectrum is a Gaussian distribution. Thus, for each deviation, the probability $P(\theta_d)$ of the magnitude of $\theta_d$ being equal to or less than one standard deviation $\sigma$ is known by conventional mathematical analysis, as 0.683, or $$P(\theta_d) = 0.683 \text{ for } \theta_d \leq \sigma. \quad (4)$$

If we now establish a reference $\sigma_r$ and compare the values of the absolute magnitude of $\theta_d$ to that reference such that if $$\theta_d \leq \sigma_r, \ P(\theta_d) 32\ 1 = P(1) \quad (5)$$

and if $$\theta_d > \sigma_r, \ P(\theta_d) = 0 = P(0) \quad (6)$$

then it follows that if $$P(\theta_d) = 1/N \ [\Sigma P(1) + \Sigma P(0)] \quad (7)$$

Then when $P(\theta_d) \geq 0.683$, $\sigma_s \leq \sigma_r$ where $\sigma_s$ is again the standard deviation of the radar return represented by A. Conversely, if $P(\theta_d) < 0.683$, then $\sigma_s > \sigma_r$. In this instance, $\sigma_r$ is the preset value of the standard deviation $\sigma$ represented by the threshold B.

Accordingly, when the magnitude of $\theta_d$ represented by the signal D is compared with the threshold B to produce a 1 output when $D \leq B$, and when the average of that output (A) is less than 68.3 percent, $\sigma_s$ is greater than $\sigma_r$. This means that the spectral width of the returns is greater than a desired spectral width represented by the threshold B, and thereby indicating the presence of turbulence. As will be apparent, by adjusting the threshold B, the spectral width which triggers a turbulence detection can be varied by a essentially shifting the reference standard deviation $\sigma_r$.

In implementing the circuit of FIG. 1, a minimum of hardware is required in comparison to the prior art systems utilizing FFT and PPP techniques. It is believed that for similar results and accuracy, FFT techniques would require 25 times as much hardware and PPP techniques five times as much hardware as the vector phase angle change distribution processor described herein. In addition, the present system does not require multiplication and division, is not sensitive to the amplitude of the radar returns, provides a continuous output, can be operated with conventional digital and microprocessor circuitry with a throughput less than 1 microsecond, makes a simple spectral width interpretation by the use of a digital 0 or 1 comparison in circuit 72, and allows the standard deviation $\sigma_r$ to be easily changed in real-time by programming to accommodate environmental requirements. Each of these greatly increase the throughput time, thereby allowing real-time application in a practical weather radar. This simplicity produces processing capable of operating with normal antenna scan speeds used in detecting precipitation and, in fact, allows time sharing with the precipitation measurement from the same radar 12 with no scan speed penalty. This enables the radar display 24 to display the precipitation, the turbulence, or a simultaneous combination of precipitation and turbulence.

In addition to the above advantages, the system further provides improvements over known prior art techniques. Specifically, since the system is not sensitive to the amplitude of the radar returns, path attenuation, commonly caused by intervening precipitation which is undetectable by the radar, does not affect the spectral width. The system is therefore more reliable in detecting turbulence than those systems previously mentioned. Further, the present system detects substantially all areas of turbulence and improves in accuracy as the radar nears the target. This improved reliability allows an aircraft operator to save considerable time by not having to avoid areas which might otherwise be devoid of turbulence. Finally, the system averages aircraft-induced and target induced velocity changes to eliminate errors, compensates for beam broadening and antenna movement problems, and compensates for errors and instabilities in the transmitter and receiver local oscillator. All of these are features that are unrecognized in the prior art.

Obviously many other modifications and variations are possible in light of the above teachings. It is therefore to be understood that within the scope of the appended claims, the invention may be practiced otherwise than as specifically described.

What is claimed is:

1. A system for estimating the spectral width of radar returns comprising:

means for receiving successive reflected radar spectral returns from a target at at least one range and providing an output signal for each return representing the vector phase angle of that return;

means responsive to said successive returns for producing successive signals representing phase angle change between successive returns;

means for filtering said phase angle change signals over time to produce an average angular mean signal output;

means for subtracting said average angular mean signal output from each of said phase angle change signals to produce a deviation angle signal; and means for comparing said deviation angle signal with a threshold signal to provide an output representing return spectral width.

2. The system of claim 1 wherein said means for receiving a radar spectral return includes means for receiving a Doppler radar spectral return.

3. The system of claim 1 wherein said means for receiving a radar spectral return includes means for receiving a Doppler radar spectral return, means for digitizing in-phase and quadrature phase components of the received Doppler return, and means for providing an output of the arc tangent of the in-phase and quadrature phase components as the vector phase angle signal for each return.

4. The system of claim 1 wherein said means for producing phase angle change signals comprises means for receiving the vector phase angle output signal for each return, means for delaying each vector phase angle output signal by one radar pulse repetition frequency period and providing an output of that delayed phase angle signal, and means for subtracting each delayed phase angle signal from the next successive phase angle signal to produce a difference output representing the phase angle change between successive returns.

5. The system of claim 1 further comprising means for varying the threshold signal.

6. A system for estimating the spectral width of radar returns comprising:

means for receiving successive reflected radar spectral returns from a target at at least one range and providing an output signal for each return representing the vector phase angle of that return;

means responsive to said successive returns for producing successive signals representing phase angle change between successive returns;

means for filtering said phase angle change signals over time to produce an average angular means signal output;

means for subtracting said average angular means signal output from each of said phase angle change signals to produce a deviation angle single; and means for comparing said deviation angle signal with a threshold signal to provide an output representing return spectral width, wherein said means for providing an output representing return spectral width comprises:

means responsive to said deviation angle signal for providing a first signal when the magnitude of said deviation angle is less than or equal to said threshold signal and a second signal when the magnitude of the deviation angle is greater than said threshold signal, means for averaging said first and second signals over time to produce an averaged signal, means for comparing said averaged signal to determine when said first signal is less than 68.3 percent of the total of said first and second signals, and means responsive to said averaged signal being less than 68.3 percent for producing an indication of spectral width.

7. The system of claim 6 wherein said means for providing an indication of spectral width comprises means for providing an alarm indication.

8. The system of claim 6 wherein said means for providing an indication of spectral width comprises a radar display means for providing a visual representation of spectral width.

9. A system for estimating the spectral width of radar returns comprising:

means for receiving successive reflected radar spectral returns from a target at at least one range and providing an output signal for each return representing the vector phase angle of that return;

means responsive to said successive returns for producing successive signals representing phase angle change between successive returns;

means for filtering said phase angle change signals over time to produce an average angular means signal output;

means for subtracting said average angular means signal output from each of said phase angle change signals to produce a deviation angle signal;

means for comparing said deviation angle signal with a threshold signal to provide an output representing return spectral width; and means for compensating for errors in said deviation angles.

10. A radar system for detecting turbulence as a function of the spectral width of radar returns comprising:

means for transmitting a succession of radar pulses to a target area at a predetermined repetition frequency;

means for receiving successive spectral returns of said radar pulses from said target area at at least one range;

means responsive to each spectral return for providing an output signal representing the vector phase angle for each radar return;

means for subtracting from each phase angle output signal, the next preceeding phase angle output signal to produce a difference signal representing the phase angle change between each radar return at the pulse repetition frequency;

means for filtering said difference signal to provide a time averaged signal representing the average angular mean;

means for subtracting the average angular mean signal from each difference signal to produce a deviation angle signal;

means for comparing each deviation angle signal with a threshold signal to produce a first signal when said deviation angle is less than or equal to said threshold signal and a second signal when said deviation angle is greater than said threshold signal; and means responsive to said first and second signals for providing an output indicating turbulence.

11. The system of claim 10 wherein said means for providing said vector phase angle output signal comprises means for providing a digitized output of the in-phase and quadrature phase components of each radar return, means for scaling said in-phase and quadrature phase components, and means for providing the arc tangent of the scaled in-phase and quadrature phase components to provide a vector phase angle output signal for each radar return.

12. The system of claim 11 wherein said means for producing said difference signal comprises means for delaying each vector phase angle output signal by one pulse repetition frequency period, and means for subtracting said delayed vector phase angle output signal from the succeeding vector phase angle output signal to produce a difference representing the phase angle change between successive returns.

13. A radar system for detecting turbulence as a function of the spectral width of radar returns comprising:

means for transmitting a succession of radar pulses to a target area at a predetermined repetition frequency;

means for receiving successive spectral returns of said radar pulses from said target area at at least one range;

means responsive to each spectral return for providing an output signal representing the vector phase angle for each radar return;

means for subtracting from each phase angle output signal, the next preceeding phase angle output signal to produce a difference signal representing the phase angle change between each radar return at the pulse repetition frequency, wherein said means for producing said difference signal comprises:

means for delaying each vector phase angle output signal by one pulse repetition frequency period, and means for subtracting said delayed vector phase angle output signal from the succeeding vector phase angle output signal to produce said difference signal representing the phase angle change between successive returns;

means for filtering said difference signal to provide a time averaged signal representing the average angular mean;

means for subtracting the average angular mean signal from each difference signal to produce a deviation angle signal;

means for comparing each deviation angle signal with a threshold signal to produce a first signal when said deviation angle is less than or equal to said threshold signal and a second signal when said deviation angle is greater than said threshold signal, wherein said means for comparing said deviation angle signals comprises:

means for providing the absolute value of the magnitude of each deviation angle, and means for detecting said absolute value of said deviation angle being less than or equal to said threshold signal to provide a digital 1 as said first signal and being greater than said threshold signal to provide a digital 0 as said second signal; and means responsive to said first and second signals for providing an output indicating turbulence.

14. The system of claim 13 wherein said means for providing an indication of turbulence comprises means for time averaging the output of said means for comparing, and means responsive to said average for determining when the number of digital 1's output is less than 68.3 percent of the total number of digital 1 and 0 outputs for providing an output indicating turbulence.

15. The system of claim 14 wherein said means for providing an output indicating turbulence is an alarm coupled to provide an audible signal.

16. The system of claim 14 wherein said means for providing an output indicating turbulence is a radar display coupled to provide a visual indication of turbulence.

17. A weather radar system for detecting weather turbulence by determining the spectral width of radar returns comprising:

means for producing radar pulses at a predetermined pulse repetition frequency;

antenna means coupled to said means for producing said radar pulses for transmitting radar pulses at said pulse repetition frequency and receiving spectral radar returns from a weather target area at at least one range;

means for scanning said antenna with respect to said weather target area;

means for digitizing in-phase and quadrature phase components of each received radar return;

means responsive to said digitized in-phase and quadrature phase components for providing an arc tangent thereof to produce a signal representing the vector phase angle of each return;

means for delaying each signal representing vector phase angle by one pulse repetition frequency period and providing a delayed output;

means for subtracting the delayed output from the next succeeding vector phase angle signal to produce a signal representing phase angle change between successive returns at the pulse repetition frequency;

means for filtering each phase angle change signal over time to produce an average angular mean signal;

means for subtracting the average angular mean signal from each phase angle change signal to produce a signal representing deviation angle;

means responsive to said deviation angle signal for providing a signal representing the absolute value of the magnitude of the deviation angle;

means for comparing the absolute value signal of the deviation angle with a threshold signal and providing a digital 1 output when said absolute value signal is less than or equal to said threshold value and a digital 0 output when said absolute value signal is greater than said threshold signal;

means for averaging said digital 1 and 0 outputs over time;

means for comparing the average output to determine when the number of digital 1 outputs is less than 68.3 percent of the total number of digital 1 and 0 outputs; and means responsive to said averaged output being less than 68.3 percent for providing an indication of turbulence.

18. The system of claim 17 wherein said means for providing an indication of turbulence comprises an alarm providing an audio signal.

19. The system of claim 17 wherein said means for providing an indication of turbulence comprises a radar display providing a visual display of turbulence.

20. A weather radar system for detecting weather turbulence by determining the spectral width of radar returns comprising:

means for producing radar pulses at a predetermined pulse repetition frequency;

antenna means coupled to said means for producing said radar pulses for transmitting radar pulses at said pulse repetition frequency and receiving spectral radar returns from a weather target area at at least one range;

means for scanning said antenna with respect to said weather target area;

means for digitizing in-phase and quadrature phase components of each received radar return;

means responsive to said digitized in-phase and quadrature phase components for providing an arc tangent thereof to produce a signal representing the vector phase angle of each return;

means for delaying each signal representing vector phase angle by one pulse repetition frequency period and providing a delayed output;

means for subtracting the delayed output from the next succeeding vector phase angle signal to produce a signal representing phase angle change between successive returns at the pulse repetition frequency;

means for filtering each phase angle change signal over time to produce an average angular mean signal;

means for subtracting the average angular means signal from each phase angle change signal to produce a signal representing deviation angle, said means for filtering introducing a bias into said deviation angle;

means responsive to antenna scan angle and radar velocity for producing a compensating signal which compensates for said bias in deviation angle to produce a signal representing corrected deviation angle;

means responsive to said corrected deviation angle signal for providing a signal representing the absolute value of the magnitude of the corrected deviation angle;

means for comparing the absolute value signal of the corrected deviation angle with a threshold signal and providing a digital 1 output when said absolute value signal is less than or equal to said threshold value and a digital 0 output when said absolute value signal is greater than said threshold signal;

means for averaging said digital 1 and 0 outputs over time;

means for comparing the average output to determine when the number of digital 1 outputs is less than 68.3 percent of the total number of digital 1 and 0 outputs; and means responsive to said averaged output being less than 68.3 percent for providing an indication of turbulence.

21. The apparatus of claim 20 wherein said means for producing a compensating signal comprises a microprocessor and further wherein said microprocessor is coupled to vary said threshold value.

* * * * *